United States Patent
Choi et al.

(10) Patent No.: US 10,747,373 B2
(45) Date of Patent: Aug. 18, 2020

(54) TOUCH PANEL AND DISPLAY DEVICE USING THE SAME

(71) Applicant: Samsung Display Co., Ltd., Yongin-si (KR)

(72) Inventors: Jae Woo Choi, Seoul (KR); Chang Sub Jung, Hwaseong-si (KR); Eun Gil Choi, Cheonan-si (KR); Sang Hyun Lim, Cheonan-si (KR); A Ra Jo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 174 days.

(21) Appl. No.: 14/935,892

(22) Filed: Nov. 9, 2015

(65) Prior Publication Data

US 2016/0209958 A1 Jul. 21, 2016

(30) Foreign Application Priority Data

Jan. 15, 2015 (KR) .................. 10-2015-0007628

(51) Int. Cl.
*G06F 3/044* (2006.01)
*G06F 3/0354* (2013.01)
*G06F 3/0488* (2013.01)
*G06F 3/041* (2006.01)

(52) U.S. Cl.
CPC ............ *G06F 3/044* (2013.01); *G06F 3/0418* (2013.01); *G06F 2203/04107* (2013.01)

(58) Field of Classification Search
CPC ............................................ G06F 2203/04107
See application file for complete search history.

(56) References Cited

U.S. PATENT DOCUMENTS

| | | | | |
|---|---|---|---|---|
| 9,245,490 B1* | 1/2016 | Cho | ................. | G09G 3/3655 |
| 2010/0123681 A1* | 5/2010 | Wu | ................. | G06F 3/045 345/174 |
| 2010/0309150 A1* | 12/2010 | Lee | ................. | G06F 3/0412 345/173 |
| 2011/0279410 A1 | 11/2011 | Han et al. | | |
| 2013/0162560 A1* | 6/2013 | Sun | ................. | G06F 3/041 345/173 |
| 2013/0162596 A1* | 6/2013 | Kono | ................. | G06F 3/044 345/174 |
| 2014/0092051 A1* | 4/2014 | Weinerth | ................. | G06F 3/044 345/174 |
| 2014/0160377 A1* | 6/2014 | Yamagishi | ................. | G06F 3/044 349/12 |
| 2014/0218328 A1* | 8/2014 | Haapakoski | ................. | G06F 3/0416 345/174 |

(Continued)

FOREIGN PATENT DOCUMENTS

| KR | 1020040021481 | 3/2004 |
|---|---|---|
| KR | 1020100092802 | 8/2010 |

(Continued)

*Primary Examiner* — Patrick N Edouard
*Assistant Examiner* — Peijie Shen
(74) *Attorney, Agent, or Firm* — H.C. Park & Associates, PLC

(57) ABSTRACT

A touch panel includes a touch electrode configured to receive a sensing input signal, a display panel, the touch electrode being disposed thereon, and a protective layer disposed between the touch electrode and the display panel, the protective layer configured to receive a protective layer driving signal.

14 Claims, 5 Drawing Sheets

(56) References Cited

U.S. PATENT DOCUMENTS

| | | | |
|---|---|---|---|
| 2014/0232691 A1 | 8/2014 | Lee | |
| 2014/0362033 A1* | 12/2014 | Mo | G06F 3/0416 345/174 |
| 2015/0378472 A1* | 12/2015 | Hekstra | G06F 3/044 345/17 |
| 2016/0092029 A1* | 3/2016 | Kim | G06F 3/0418 345/174 |
| 2016/0124555 A1* | 5/2016 | Hong | G06F 3/016 345/173 |
| 2016/0179268 A1* | 6/2016 | Hong | G06F 3/044 345/174 |
| 2017/0269736 A1* | 9/2017 | Jeong | G06F 3/044 |

FOREIGN PATENT DOCUMENTS

| | | |
|---|---|---|
| KR | 1020120005684 | 1/2012 |
| KR | 1020130033541 | 4/2013 |
| KR | 1020130044267 | 5/2013 |

\* cited by examiner

TOUCH PANEL AND DISPLAY DEVICE USING THE SAME

CROSS-REFERENCE TO RELATED APPLICATION

This application claims priority from and the benefit of Korean Patent Application No. 10-2015-0007628, filed on Jan. 15, 2015, which is hereby incorporated by reference for all purposes as if fully set forth herein.

BACKGROUND

Field

Exemplary embodiments of the present invention relate to a touch panel and a display device using the same. More particularly, exemplary embodiments of the present invention relate to a touch panel and a display device using the same that may prevent deterioration of a touch sensing capability.

Discussion of the Background

A display device, such as a liquid crystal display (LCD), an organic light emitting diode (OLED) display, and an electrophoretic display may include a field generating electrode and an electro-optical active layer. The liquid crystal display may include a liquid crystal layer as the electro-optical active layer, an organic light emitting diode display may include an organic emission layer as the electro-optical active layer, and an electrophoretic display may include charged particles. The field generating electrode may be connected to a switching element, such as a thin-film transistor, to receive a data signal, and the electro-optical active layer may convert the data signal to an optical signal to display an image.

A display device may include a touch sensing function through which a user may interact, in addition to an image displaying function. The touch sensing function may determine touch information such as whether an object approaches or touches a screen, a touch position thereof, and the like, by sensing a change in pressure, charges, light, and the like, which are applied onto the screen of the display device, when a user writes a text or draws a figure by approaching or touching the screen with a finger or a touch pen. The display device may receive an image signal based on the touch information to display an image.

The touch sensing function may be implemented by a touch sensor. The touch sensor may be classified into various types, such as a resistive type, a capacitive type, an electro-magnetic (EM) type, and an optical type.

Among the touch sensors, the capacitive type touch sensor includes a sensing capacitor including sensing electrodes that may transfer sensing signals and determine whether a touch exists, a touch position, and the like, by sensing a change in charge capacitance or a change in charged amount of the sensing capacitor generated when a conductor such as a finger approaches the touch sensor. The capacitive type touch sensor includes touch electrodes disposed in a touch sensing area and a touch signal line connected to the touch electrodes. The touch signal line may transfer a touch driving signal to the touch electrode or transfer a sensing output signal of the touch electrode generated, according to a touch to a sensing signal controller.

A touch sensor may be formed in the touch panel to be attached onto the display device (add-on cell type), outside the substrate of the display device (on-cell type), or inside the display device (in-cell type). A touch area may overlap a display area in the display device. Panels including the touch sensor may be referred to as touch panels. The touch panels may be a panel of the display device including the touch sensor, or may be a panel attached to the display device. Since a periphery of the touch area extends along a peripheral area, a touch signal line may be connected to the sensing signal controller.

When a user holds and uses a touch panel, the user may grip a peripheral area of the touch panel with the user's hand or other objects. At that time, when multi-hovering, a charge amount of the touch electrode may be decreased compared with a base capacitance of the touch panel, which may deteriorate a touch sensing capability in the touch area.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch panel and a display device using the same that may improve touch sensitivity by decreasing a base capacitance of the touch panel.

Exemplary embodiments of the present invention also provide a touch panel and a display device using the same that may improve a touch sensing capability of the touch panel while multi hovering.

Exemplary embodiments of the present invention further provide a touch panel and a display device using the same that may prevent noise of the display panel.

Additional aspects will be set forth in the detailed description which follows, and, in part, will be apparent from the disclosure, or may be learned by practice of the inventive concept.

According to an exemplary embodiment of the present invention, a touch pane includes a touch electrode configured to receive a sensing input signal a display panel, the touch electrode being disposed thereon, and a protective layer disposed between the touch electrode and the display panel, the protective layer configured to receive a protective layer driving signal.

The protective layer driving signal may have the same voltage level as the sensing input signal, and the protective layer driving signal may be configured to be applied to the protective layer at the same time when the sensing input signal is applied to the touch electrode.

A potential difference between the touch electrode and the protective layer may be 0.

The touch electrode may include self-sensing capacitor configured to be charged by a touch driving signal, and the touch electrode may be configured to detect a touch based on a change of a charged amount of the self-sensing capacitor.

The touch panel may further include an insulating layer disposed between the touch electrode and the protective layer, in which the protective layer driving signal may have a ground potential level.

The insulating layer may include an insulating material having a low dielectric constant.

According to an exemplary embodiment of the present invention, a display device includes a display unit including an upper electrode, a touch panel disposed on the display unit, the touch panel including a touch electrode configured to receive a sensing input signal, and a protective layer disposed below the touch electrode, the protective layer configured to receive a protective layer driving signal at the same voltage level as the sensing input signal, and a protective layer controller configured to apply the protective layer driving signal.

The protective layer controller may be configured to apply the protective layer driving signal to the protective layer at the same time when the sensing input signal is applied to the touch electrode.

A potential difference between the touch electrode and the protective layer may be 0, and a base capacitance between the touch electrode and the upper electrode may be 0.

The display device may further include a self-sensing capacitor configured to be charged by a touch driving signal, and the touch electrode may be configured to detect a touch based on a change of a charged amount of the self-sensing capacitor.

According to an exemplary embodiment of the present invention, a display device includes a display unit including an upper electrode, a touch panel disposed on the display unit, the touch panel including a touch electrode configured to receive a sensing input signal, a protective layer disposed below the touch electrode, the protective layer configured to receive a protective layer driving signal having a ground potential level, an insulating layer disposed between the touch electrode and the protective layer, and a protective layer controller configured to apply the protective layer driving signal.

The insulating layer may include an insulating material having a low dielectric constant, and a base capacitance between the touch electrode and the upper electrode may be 0.

The display device may further include an encapsulation layer disposed between the protective layer and the upper electrode.

A length of the protective layer may be substantially the same as a length of the touch electrode overlapping the protective layer.

The touch panel may further include a first insulating layer covering the touch electrode, a second insulating layer disposed between the touch electrode and the protective layer, and a portion of the second insulating layer may contact the touch electrode.

The protective layer may include an indium tin oxide (ITO) or indium zinc oxide (IZO), and the upper electrode may include a cathode.

A voltage level of the sensing input signal may be different from a voltage level of the protective layer driving signal.

According to the exemplary embodiments of the present invention, touch sensitivity of a touch panel may be increased by decreasing a base capacitance of the touch panel.

According to the exemplary embodiments of the present invention, the touch sensitivity of the touch panel may be improved in multi hovering.

According to the exemplary embodiments of the present invention, noise of the display panel may be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
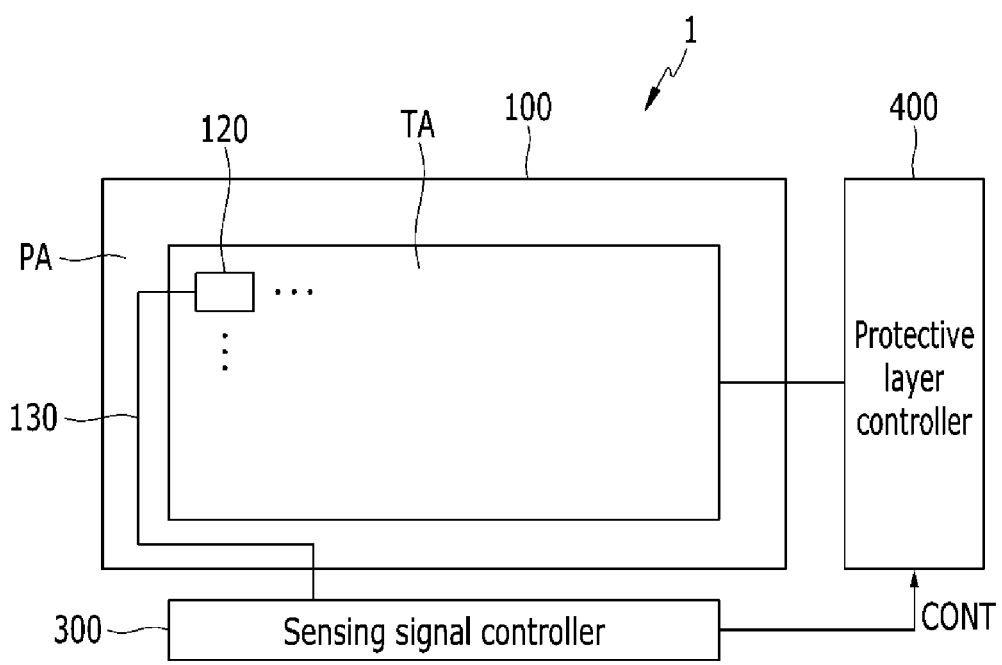
FIG. 1 is a block diagram of a touch display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram of a touch panel according to an exemplary embodiment of the present invention.

Hereinafter, a touch panel according to the present exemplary embodiment of the present invention will be described with reference to FIG. 1.

A display device 1 according to an exemplary embodiment includes a touch panel 100, a sensing signal controller 300, a protective layer controller 400, and a display panel 200 (see FIG. 3) positioned below the touch panel 100.

Referring to FIG. 1, the touch panel 100 includes a touch sensor 120 that may sense a touch of an external object such as a hand and a pen. The touch sensor 120 may be formed on a separate panel to be attached on a display panel of a display device such as a liquid crystal display (LCD), an organic light emitting diode (OLED) display (add-on cell type), formed outside a substrate configuring the display device (on-cell type), or formed inside the display panel of the display device (in-cell type). The display panel including the touch sensor 120, the separate panel, or the like may referred as the touch panel 100.

The touch panel 100 includes a touch area TA, and a peripheral area PA therearound. The touch area TA may overlap with a display area in which an image is displayed, as an area that may sense a touch when an object approaches or touches the touch panel 100. The touch may include a direct contact on the touch panel 100 by an external object such as a user's hand, an approach to the touch panel 100 by the external object, and hovering over the touch panel by the external object. Touch sensors 120 and touch signal lines 130 are positioned in the touch area TA. The touch sensors 120 may be arranged in a matrix form. The touch signal line 130 is connected to the touch sensor 120 and transfers a touch driving signal [Sd] (see FIG. 4) or a sensing output signal.

The touch sensor 120 may sense a touch by a capacitive type. The touch signal lines 130 extending from the touch area TA is positioned in the peripheral area PA. The touch signal line 130 is connected to a sensing signal controller 300 controlling the touch sensor 120 to transfer the touch driving signal [Sd] or the sensing output signal. A light blocking member (not illustrated) through which light may not pass may be positioned in the peripheral area PA.

The sensing signal controller 300 controls the touch sensor 120 and the protective layer controller 400. The sensing signal controller 300 may transfer the touch driving signal [Sd] to the touch sensor 120 through the touch signal line 130 or receive the sensing output signal. The sensing signal controller 300 may process the sensing output signal to generate touch information on whether a touch exists and the touch position. The sensing signal controller 300 may be mounted on a flexible printed circuit film in an IC chip, form to be attached onto the touch panel 100 or mounted on a separate printed circuit substrate. The sensing signal controller 300 generates a driving control signal CONT for controlling a protective layer driving signal [Sg] (see FIG. 5) applied to the protective layer 140 (see FIG. 4).

The protective layer controller 400 generates the protective layer driving signal [Sg] (for example, a protective layer driving voltage) according to the driving control signal CONT, to apply the generated protective layer driving signal [Sg] to the protective layer.

Figure 2:
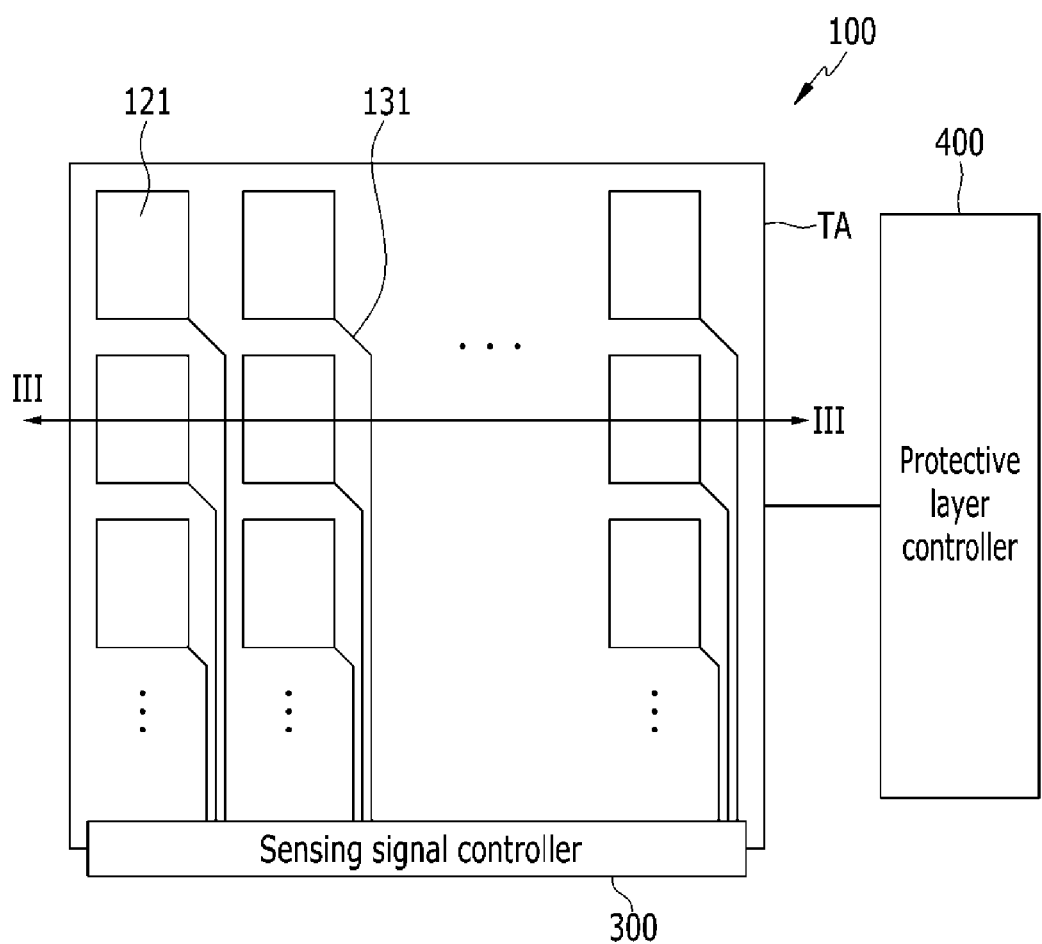
FIG. 2 is a plan view illustrating a touch electrode and a touch signal line of a touch panel according to an exemplary embodiment of the present invention.

FIG. 2 is a plan view illustrating a touch electrode and a touch signal line of a touch panel according to an exemplary embodiment of the present invention.

Referring to FIG. 2, the touch area TA includes touch electrodes 121 and connection wirings 131 connected to the touch electrodes 121.

The touch electrodes 121 may be arranged in a matrix form and formed on the same layer as each other. The touch electrode 121 may be made of a transparent conductive material such as indium tin oxide (ITO), indium zinc oxide (IZO), metal nanowire, conductive polymer, and a thin metal layer. When the touch electrode 121 includes metal, the metal may be silver (Ag), copper (Cu), or the like. A shape of the touch electrode 121 is a quadrangle as illustrated in FIG. 1, for example, a diamond, but may alternatively have various shapes. A length of one side of the touch electrode 121 may be approximately several mm, for example, approximately 10 mm or less. According to an exemplary embodiment of the present invention, the length of one side of the touch electrode 121 may be about 4 mm to 5 mm, but a size of the touch electrode 121 may vary according to a touch sensing resolution.

The touch electrodes 121 are separated from each other in the touch area, and different touch electrodes 121 may be connected with the sensing signal controller 300 through different connection wirings 131.

The touch electrode 121 according to an exemplary embodiment of the present invention receives the touch driving signal [Sd] from the sensing signal controller 300 through each connection wiring 131 and generates a sensing output signal according to a touch, to transmit the generated sensing output signal to the sensing signal controller 300. Each touch electrode 121 forms a self sensing capacitor to receive the touch driving signal [Sd] and then may be charged at a predetermined charge amount. Thereafter, when an external object such as a finger touches the touch electrode 121, the charged amount of the self sensing capacitor may be changed so that a sensing output signal different from the input touch driving signal [Sd] may be output. As such, touch information on whether the touch exists and a touch position may be determined through the generated sensing output signal.

The connection wiring 131 connects the touch electrode 121 and the sensing signal controller 300 to transfer the touch driving signal [Sd] or the sensing output signal. The connection wiring 131 may be positioned on the same layer as the touch electrode 121 and include the same material as the touch electrode 121. Alternatively the connection wiring 131 may be positioned on a different layer from the touch electrode 121 and connected to the touch electrode 121 through a separate connection part.

Referring to FIG. 2, according to the present exemplary embodiment, the number of connection wirings 131 disposed between touch electrode 121 columns is increased toward the sensing signal controller 300. Accordingly, the size of the touch electrode 121 may be decreased toward the sensing signal controller 300.

A width of the connection wiring 131 may be approximately in the range of 10 μm to 100 μm. Accordingly, the connection portions of the touch electrode 121 and the connection wiring 131 form a bottle neck portion of which a width may be rapidly increased or decreased.

The sensing signal controller 300 is connected to the touch electrode 121 of the touch panel 100 to transfer the touch driving signal [Sd] to the touch electrode 121 and receives the sensing output signal. The sensing signal controller 300 may process the sensing output signal to generate the touch information on whether a touch exists and the touch position. The sensing signal controller 300 may be positioned on a separate printed circuit substrate from the touch panel 100 to be connected to the touch panel 100, attached on the touch panel 100 in an IC chip form or a tape carrier package (TCP) form, or integrated on the touch panel 100.

Figure 3:
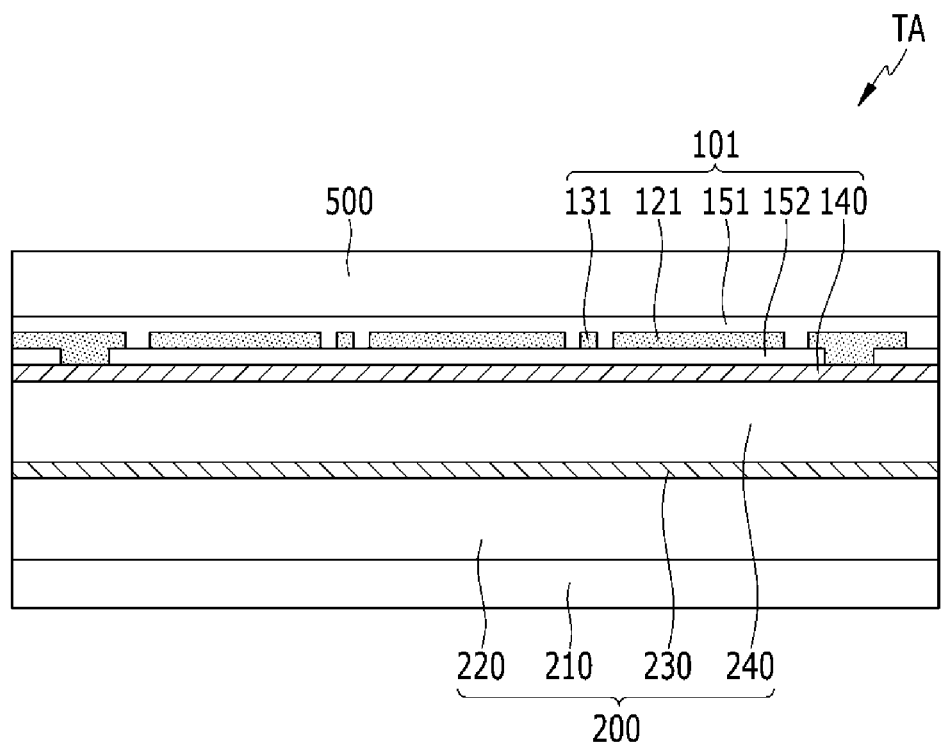
FIG. 3 is a cross-sectional view illustrating a touch sensing area of the touch panel illustrated in FIG. 2 taken along line III-III.

FIG. 3 is a cross-sectional view illustrating a touch sensing area of the touch panel illustrated in FIG. 2 taken along line III-III.

Hereinafter, the touch area TA according to an exemplary embodiment of the present invention will be described with reference to FIG. 3.

Referring to FIG. 3, the touch area TA according to the present exemplary embodiment includes a touch panel 101, a cover window 500, and a display panel 200.

An anti-reflective layer (not illustrated) including a polarizer for improving visibility by reducing external light reflection may be attached onto the outer surface of the display panel 200. The cover window 500 may be attached onto the touch panel 101 by using an adhesive.

The touch panel 101 includes a touch electrode 121 disposed on a transparent substrate (not illustrated), a connection wiring 131, a first insulating layer 151 electrically insulating the connection wiring 131 from the touch electrode 121, a touch electrode 121, a protective layer 140, and a second insulating layer 152 electrically insulating the protective layer 140 from the connection wiring 131.

Structures and operations of the touch electrode 121 and the connection wiring 131 are described above with reference to FIG. 2, and accordingly, repeated description thereof will be omitted. The touch driving signal [Sd] is applied to the touch electrode 121 and the connection wiring 131.

The protective layer 140 is formed of a transparent conductive material such as indium tin oxide (ITO) or indium zinc oxide (IZO), and the protective layer driving signal [Sg] is applied to the protective layer 140.

The protective layer driving signal [Sg] applied to the protective layer 140 will be described below.

The display panel 200 includes a lower electrode 210, an organic emission layer 220, an upper electrode 230, and an encap layer 240. The organic emission layer 220 includes an organic light emitting diode (OLED) (not illustrated) including a lower electrode 210, an organic emission layer 220, and an upper electrode 230. The display panel 200 may be an organic light emitting panel using pixels including the OLEDs. The lower electrode 210 forms an anode of the OLED. The upper electrode 230 forming a cathode of the OLED is formed above the organic emission layer 220. The encap layer 240 for encapsulation is positioned on the upper electrode 230.

In the organic light emitting panel, when a predetermined voltage is applied to the lower electrode 210 and the upper electrode 230, according to a selected color signal, holes injected from the lower electrode 210 and electrons supplied from the upper electrode 230 are transported to the organic emission layer 220 to form excitons, and when the excitons are transited from an excited state to a ground state, light may be generated to be emitted in a visible ray form. In this case, since the emitted light passes through the transparent lower electrode 210 or upper electrode 230 to be discharged outside, the organic light emitting diode display may implement an image.

The organic emission layer 220 may also be a single layer made of a light emitting material, or a multiple layer having a hole injection layer, a hole transport layer, an emission layer, an electron transport layer, and an electron injection layer so as to enhance light emission efficiency. The organic emission layer 220 expresses colors of red R, green G, and blue B, which may be formed by patterning a separate organic material emitting light of red R, green G, and blue B for each pixel area.

According to the present exemplary embodiment, the display panel 200 may be a display panel including any one display device of a liquid crystal display (LCD), an electrophoretic display, a field emission display (FED), and a plasma display panel (PDP).

Figure 4:
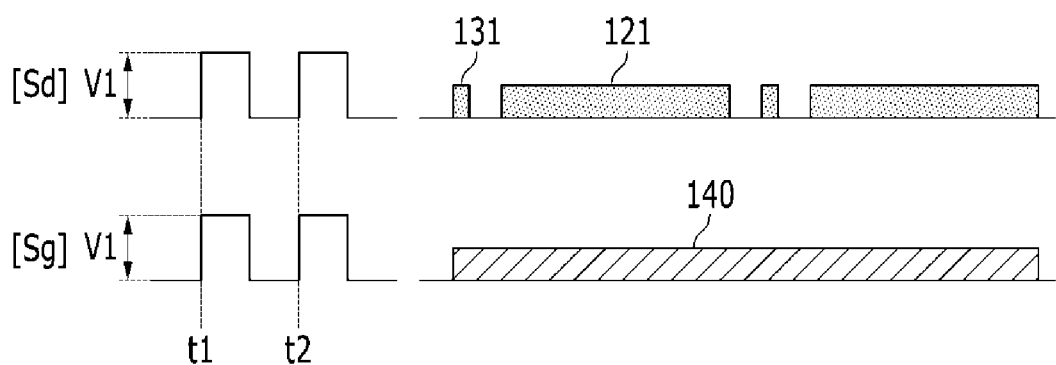
FIG. 4 illustrates a driving signal of a protective layer according to an exemplary embodiment of the present invention.

FIG. 4 illustrates a protective layer driving signal according to the present exemplary embodiment.

Hereinafter, the protective layer driving signal will be described with reference to FIG. 4.

Referring to FIG. 4, at a time t1, the sensing signal controller 300 applies a touch driving signal [Sd] at a first level V1 to the touch electrode 121 and the connection wiring 131. Further, at the time t1, the protective layer controller 400 applies the protective layer driving signal [Sg] at the first level V1 to the protective layer 140.

Subsequently, at a time t2, the sensing signal controller 300 applies the touch driving signal [Sd] at the first level V1 to the touch electrode 121 and the connection wiring 131. Further, at the time t2, the protective layer controller 400 applies the protective layer driving signal [Sg] at the first level V1 to the protective layer 140.

Accordingly, the touch driving signal [Sd] and the protective layer driving signal [Sg] at the same level are applied to the touch electrode 121, the connection wiring 131, and the protective layer 140 at the same time, respectively, and thus, a potential difference between the touch electrode 121, the connection wiring 131, and the protective layer 140 is 0.

When hovering detecting is implemented to detect a movement of an external object that approaches the touch area TA, the touch sensing result may be very sensitive to the changes in capacitance and charge amount of the sensing capacitor. Accordingly, the hovering detecting capacity in the touch area TA may deteriorate due to a base capacitance formed between the upper electrode layer 230, the touch electrode 121, and the connection wiring 131. According to the present exemplary embodiment, the protective layer 140 may prevent the effect of the base capacitance that may deteriorate the hovering detecting capacity in the touch area TA.

Figure 5:
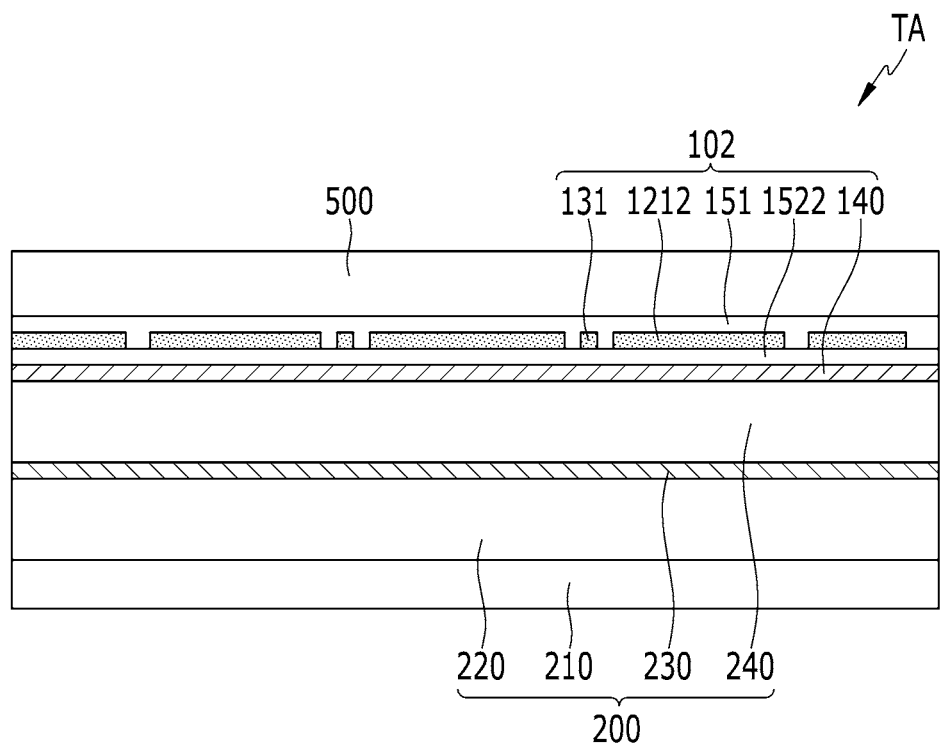
FIG. 5 is a cross-sectional view illustrating a touch sensing area according to an exemplary embodiment of the present invention taken along line III-III.

FIG. 5 is a cross-sectional view illustrating a touch sensing area according to an exemplary embodiment of the present invention, taken along line III-III of FIG. 2.

Hereinafter, a touch area TA according to an exemplary embodiment of the present invention will be described with reference to FIG. 5.

Referring to FIG. 5, the touch area TA according to the present exemplary embodiment includes a touch panel 102, a cover window 500, and a display panel 200. The touch panel 102 includes a touch electrode 1212, a connection wiring 131, a first insulating layer 151, a second insulating layer 1522, and a protective layer 140.

A shape of the touch electrode 1212 of the touch panel 102 illustrated in FIG. 5 is different from a shape of the touch electrode 121 of the touch panel 101 illustrated in FIG. 3. Further, a material of the second insulating layer 1522 is different than that of the second insulating layer 152. In FIGS. 3 and 5, the same elements may be designated with the same reference numeral, and accordingly, repeated description thereof will be omitted.

The touch electrode 1212 is not electrically connected to the protective layer 140. More particularly, the touch electrode 1212 is electrically insulated from the protective layer 140 by the second insulating layer 1522. Further, the second insulating layer 1522 may be an insulating material having a low dielectric constant.

Figure 6:
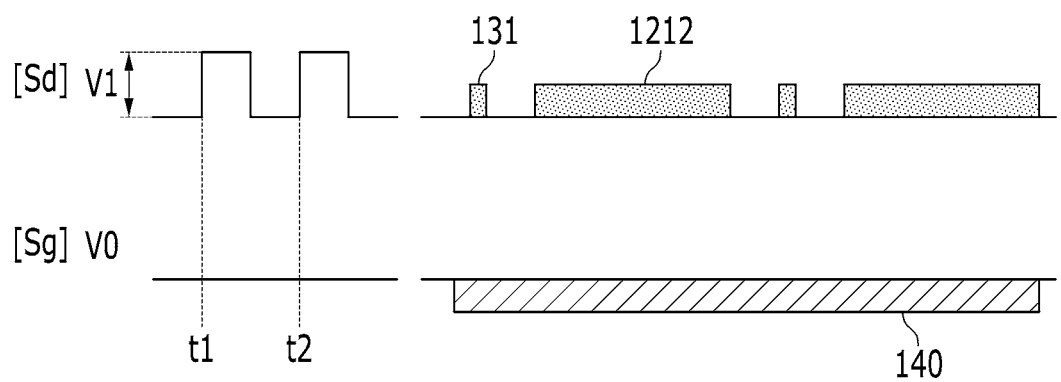
FIG. 6 illustrates a driving signal of a protective layer according to an exemplary embodiment of the present invention.

FIG. 6 illustrates a protective layer driving signal according to an exemplary embodiment of the present invention.

Hereinafter, a protective layer driving signal according to an exemplary embodiment of the present invention will be described with reference to FIG. 6.

Referring to FIG. 6, at a time t1, the sensing signal controller 300 applies a touch driving signal [Sd] at a first level V1 to the touch electrode 121. Further, at the time t1, the protective layer controller 400 applies a protective layer driving signal [Sg] at a second level V0 to the protective layer 140. Subsequently, at a time t2, the sensing signal controller 300 applies the touch driving signal [Sd] at the first level V1 to the touch electrode 1212. Further, at a time t2, the protective layer controller 400 applies the protective layer driving signal [Sg] at the second level V0 to the protective layer 140. In this case, the applied protective layer driving signal [Sg] at the second level V0 may be a ground GND potential (e.g., 0V). Accordingly, an effect by the base capacitance formed between the upper electrode layer 230, the touch electrode 121, and the connection wiring 131 may be prevented by the protective layer 140 and the second insulating layer 1522. Further, display noise due to the display panel 200 may be prevented by the protective layer 140.

Figure 7:
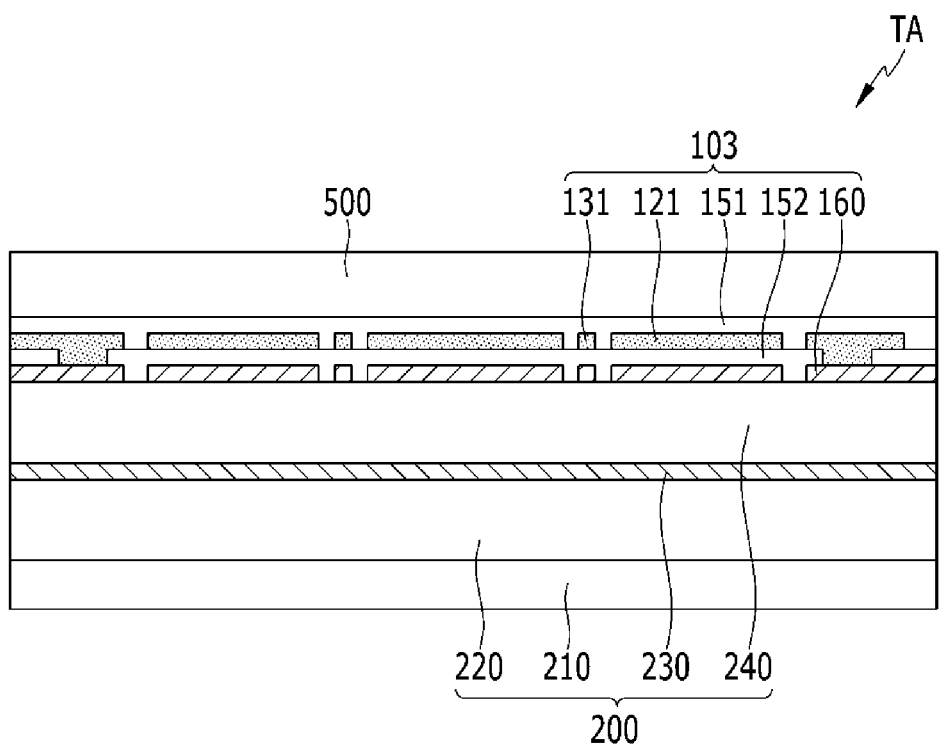
FIG. 7 is a cross-sectional view illustrating a touch sensing area according to an exemplary embodiment of the present invention taken along line III-III.

FIG. 7 is a cross-sectional view illustrating a touch sensing area according to an exemplary embodiment of the present invention, taken along line III-III of FIG. 2.

Hereinafter, a touch area TA according to an exemplary embodiment of the present invention will be described with reference to FIG. 7.

Referring to FIG. 7, the touch area TA according to the present exemplary embodiment includes a touch panel 103, a cover window 500, and a display panel 200. The touch panel 102 includes a touch electrode 121, a connection wiring 131, a first insulating layer 151, a second insulating layer 152, and a protective layer 160.

A shape of the protective layer 160 of the touch panel 103 illustrated in FIG. 7 is different from a shape of the protective layer 140 of the touch panel 101 illustrated in FIG. 3. In FIGS. 3 and 7, the same elements may be designated with the same reference numeral, and accordingly, repeated description thereof will be omitted.

The protective layer 160 may be patterned with the same shape as the touch electrode 121. Patterns of the protective layer 160 are electrically insulated from each other by the second insulating layer 152. The protective layer driving signal [Sg] applied to the protective layer 160 may be the same as the protective layer driving signal [Sg] illustrated with reference to FIG. 5.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:
1. A touch panel, comprising:
a plurality of touch electrodes configured to receive a sensing input signal;
a plurality of connection wirings connected to the touch electrodes, respectively, the connection wirings and the touch electrodes disposed on the same plane;
a display panel comprising an upper electrode, the touch electrodes being disposed thereon;
a protective layer disposed between the touch electrodes and the display panel, the protective layer configured to receive a protective layer driving signal;
a first insulating layer disposed between the connection wirings and the touch electrodes and covering the connection wirings and the touch electrodes;
a second insulating layer disposed below the first insulating layer, between the touch electrodes and the protective layer, and configured to electrically insulate the protective layer from the connection wirings; and an encapsulation layer disposed between the protective layer and the upper electrode, wherein each of the touch electrodes comprises a self-sensing capacitor configured to be charged by a touch driving signal, wherein each of the touch electrodes is configured to detect a touch based on a change in a charged amount of the self-sensing capacitor, and wherein the protective layer directly contacts at least one or more touch electrodes disposed adjacent to both ends of the display panel through the second insulating layer.

2. The touch panel of claim 1, wherein:

the protective layer driving signal has the same voltage level as the sensing input signal; and the protective layer driving signal is configured to be applied to the protective layer at the same time when the sensing input signal is applied to the touch electrode.

3. The touch panel of claim 1, wherein a potential difference between the touch electrode and the protective layer is 0.

4. The touch panel of claim 1, wherein the first and second insulating layers comprise an insulating material having a low dielectric constant.

5. A display device, comprising:

a display unit comprising an upper electrode;

a touch panel disposed on the display unit, the touch panel comprising:

a plurality of touch electrodes configured to receive a sensing input signal;

a plurality of connection wirings connected to the touch electrode, respectively, the touch electrodes and the connection wirings disposed on the same plane;

a protective layer disposed below the touch electrode, the protective layer configured to receive a protective layer driving signal having the same voltage level as the sensing input signal;

a first insulating layer disposed between the connection wirings and the touch electrodes and covering the connection wirings and the touch electrodes;

a second insulating layer disposed below the first insulating layer, between the touch electrodes and the protective layer, and configured to electrically insulate the protective layer from the connection wirings;

an encapsulation layer disposed between the protective layer and the upper electrode; and a protective layer controller configured to apply the protective layer driving signal, wherein each of the touch electrodes comprises a self-sensing capacitor configured to be charged by a touch driving signal, wherein each of the touch electrodes is configured to detect a touch based on a change of a charged amount of the self-sensing capacitor, and wherein the protective layer directly contacts at least one or more touch electrodes disposed adjacent to both ends of the display panel through the second insulating layer.

6. The display device of claim 5, wherein the protective layer controller is configured to apply the protective layer driving signal to the protective layer at the same time when the sensing input signal is applied to the touch electrode.

7. The display device of claim 6, wherein a potential difference between the touch electrode and the protective layer is 0.

8. A display device, comprising:

a display unit comprising an upper electrode;

a touch panel disposed on the display unit, the touch panel comprising:

a plurality of touch electrodes configured to receive a sensing input signal;

a protective layer disposed between the touch electrodes, the protective layer configured to receive a protective layer driving signal having a ground potential level;

a plurality of connection wirings connected to the touch electrode, respectively, the touch electrodes and the connection wirings disposed on the same plane;

a first insulating layer disposed between the connection wirings and the touch electrodes and covering the connection wirings and the touch electrodes;

a second insulating layer disposed below the first insulating layer, between the touch electrodes and the protective layer, and configured to electrically insulate the protective layer from the connection wirings;

a protective layer controller configured to apply the protective layer driving signal; and an encapsulation layer disposed between the protective layer and the upper electrode, wherein each of the touch electrodes comprises a self-sensing capacitor configured to be charged by a touch driving signal, wherein each of the touch electrodes is configured to detect a touch based on a change in a charged amount of the self-sensing capacitor, and wherein the second insulating layer comprises an insulating material having a low dielectric constant.

9. The display device of claim 8, wherein the first insulating layer comprises an insulating material having a low dielectric constant.

10. The touch panel of claim 1, wherein the protective layer driving signal is configured to be applied to the protective layer at the same time when the sensing input signal is applied to the touch electrode.

11. The display device of claim 5, wherein a length of the protective layer is substantially the same as a length of the touch electrode overlapping the protective layer.

12. The display device of claim 8, wherein:

the protective layer comprises an indium tin oxide (ITO) or indium zinc oxide (IZO); and the upper electrode comprises a cathode.

13. The display device of claim 5, wherein:

the protective layer comprises an indium tin oxide (ITO) or indium zinc oxide (IZO); and the upper electrode comprises a cathode.

14. The display device of claim 8, wherein the protective layer includes a first portion and a second portion spaced apart from each other, and a length of the first portion is substantially the same as a length of the touch electrode overlapping the first portion.

* * * * *